C. G. CARLSON.
POWER TRANSMISSION MECHANISM.
APPLICATION FILED JULY 20, 1915.
1,180,695.
Patented Apr. 25, 1916.
2 SHEETS—SHEET 2.
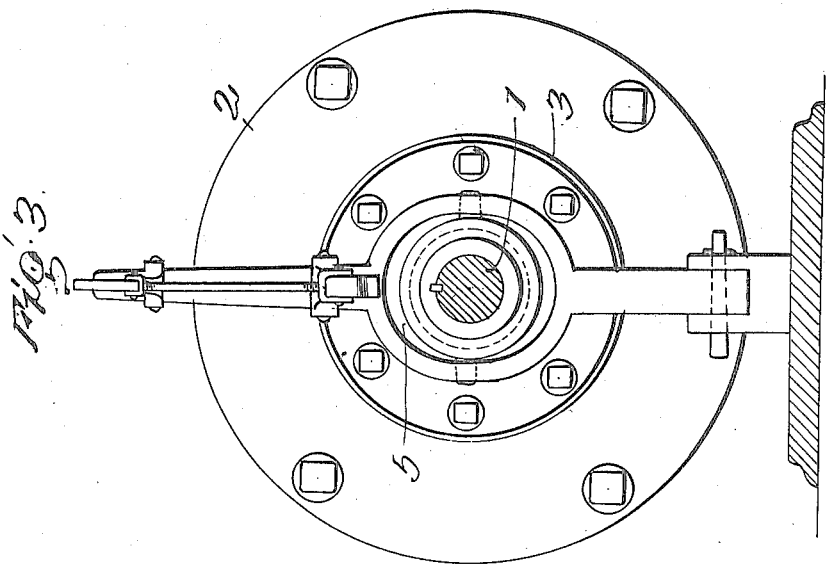
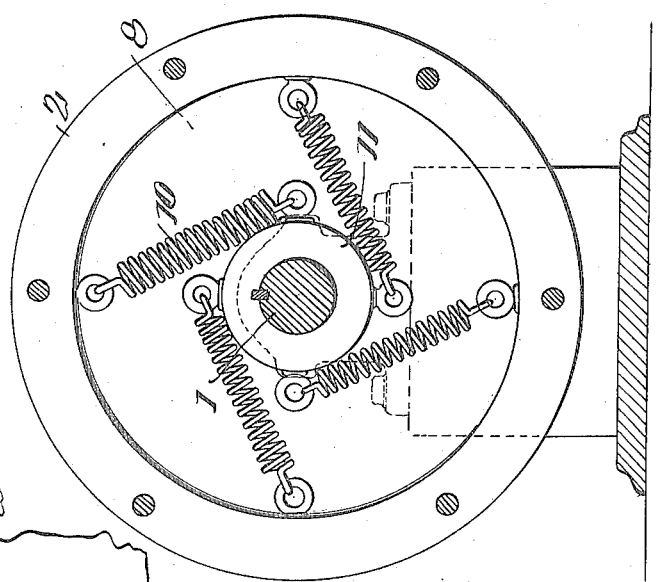
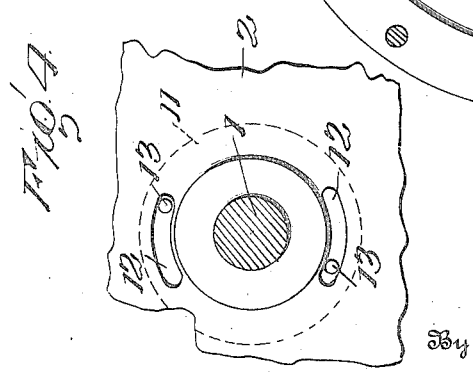
Inventor
C. G. Carlson
By
[signature], Attorneys

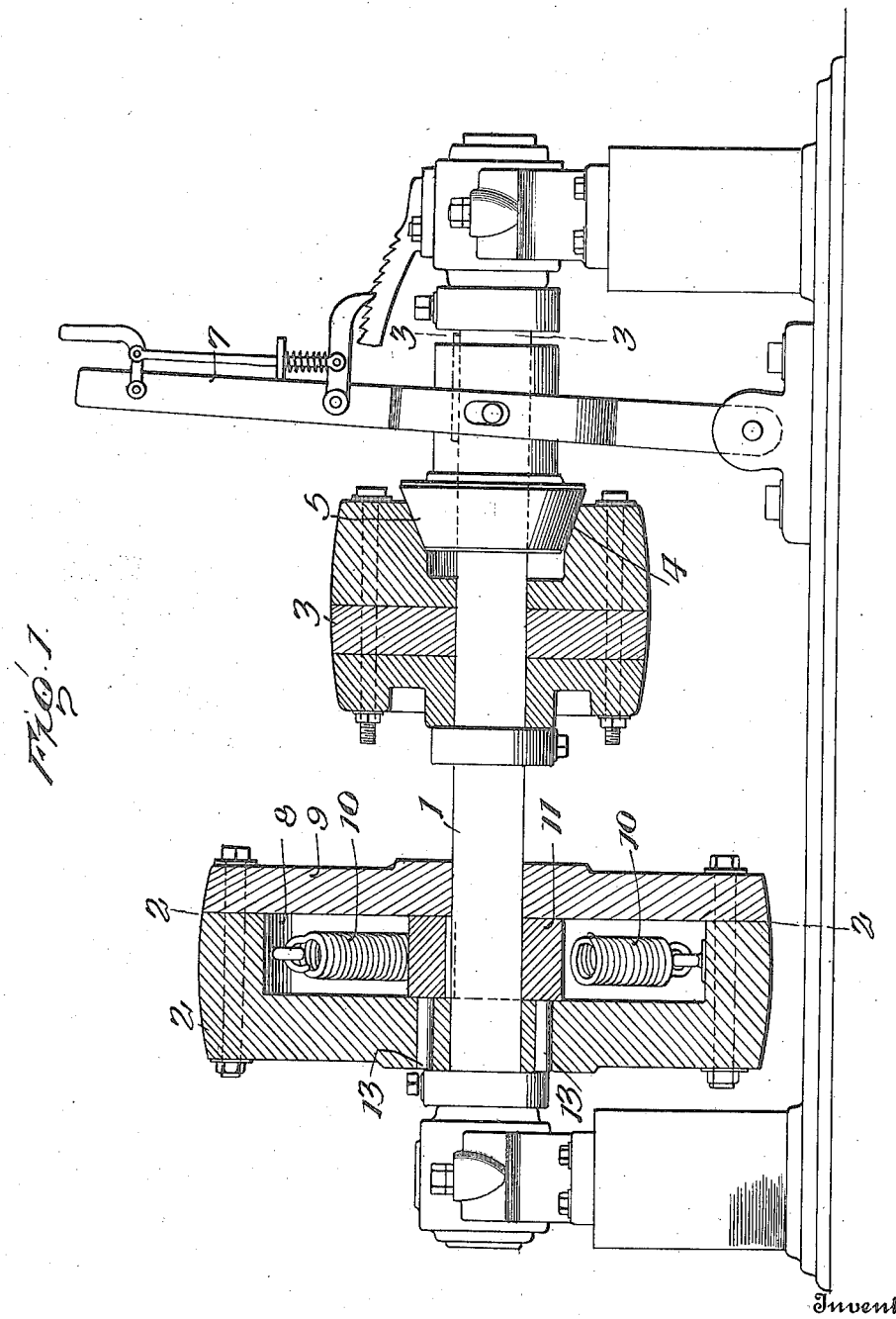

UNITED STATES PATENT OFFICE.

CHARLES G. CARLSON, OF GRANTSBURG, WISCONSIN.

POWER-TRANSMISSION MECHANISM.

1,180,695.  Specification of Letters Patent.  Patented Apr. 25, 1916.

Application filed July 20, 1915. Serial No. 41,001.

*To all whom it may concern:*

Be it known that I, CHARLES G. CARLSON, a citizen of the United States, residing at Grantsburg, in the county of Burnett and State of Wisconsin, have invented certain new and useful Improvements in Power-Transmission Mechanism, of which the following is a specification.

This invention has for its object to overcome shock incident to the sudden starting of machinery of any nature particularly when the load is suddenly thrown upon a motor by the shifting of a clutch into engagement.

The invention interposes a yieldable connection between a pulley and shaft whereby the sudden throwing of the one or the other into clutched engagement will gradually bring the other into motion by means of the yieldable connection, thereby preventing the jerk or shock incident to a sudden starting of the parts.

Specifically considered the invention consists of a shaft, a pulley loose upon the shaft, a yieldable connection between the pulley and shaft, and means for admitting of the pulley and shaft having a limited movement so as to prevent overstraining of the yieldable connection.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings,—Figure 1 is a detail view of a power transmission embodying the invention, the same being partly in section and partly in elevation; Fig. 2 is a transverse section on the line 2—2 of Fig. 1 looking to the left; Fig. 3 is a section on the line 3—3 of Fig. 1 looking to the left; Fig. 4 is a detail view showing the stop means for limiting the relative movement between the pulley and shaft.

Corresponding and like parts are referred to in the following description and indicated in all the views of the drawings by the same reference characters.

The numeral 1 designates a shaft upon which are mounted two pulleys 2 and 3. One of the pulleys is adapted to be connected with a motor or source of power and the other pulley is adapted to be connected in any manner with a machine or part to be driven. Both pulleys are loose upon the shaft 1 but the pulley 2 is yieldably connected with the shaft and has a limited relative play thereon. In the present instance the pulley 3 is shown as being smaller than the pulley 2 and is adapted to be connected to the shaft 1 by means of a clutch and the machine or part to be driven is connected with the pulley 3 in any desired way to receive power therefrom. A clutch of any design may be employed for connecting the pulley 3 to the shaft 1. As shown a tapered recess 4 is formed in one side of the pulley 3 and the wall thereof constitutes one member of a clutch. The other member 5 of the clutch is of conical form and is disposed at one end of a sleeve 6 which is splined to the shaft 1 and adapted to be operated by means of a shipper lever 7. When the sleeve 6 is moved away from the pulley 3 the shaft 1 is adapted to rotate freely but when the sleeve 6 is moved toward the pulley 3 the latter is clutched to the shaft and rotates therewith.

The pulley 2 is preferably formed in one side with a recess 8 which is adapted to be closed by means of a plate 9. Within the recess 8 is located a plurality of contractile helical springs 10, which constitute the yieldable connecting means between the pulley 2 and shaft 1. For convenience a pulley 11 is splined to the shaft 1 and is disposed within the recess 8 of the pulley 2 and has the inner ends of the springs 10 connected thereto, the outer ends of such springs being connected to the rim portion of the pulley 2. The springs 10 have a tangential arrangement with reference to the pulley 11 as indicated most clearly in Fig. 2 so that such springs are subjected to lineal tension when transmitting force from the pulley to the shaft or vice versa. To prevent overstraining of the springs 10 stop means are provided between the pulleys 2 and 11, the same consisting of arcuate slots 12 formed in the pulley 2 and pins 13 projecting laterally from the pulley 11 and entering the slots 12. The pulley 2 is adapted to be connected with a source of power in any usual way, such power being transmitted to the shaft 1 by means of the yieldable connection. When the load is thrown suddenly upon the motor by the clutching of the pulley 3 to the shaft 1 the springs 10 yield, thereby preventing any shock or jerk, such springs stretching and gradually throwing the load upon the motor. In the event of the springs stretching to admit of the pins 13 moving to the opposite ends of the slots 12 the load will be carried by the stop means, thereby preventing injury to or overstraining of the yieldable connecting means between the pulley and shaft.

Having thus described the invention, what is claimed as new is:—

1. In combination, a shaft, a pulley fixed to the shaft, a second pulley loose upon the shaft, yieldable connecting means between the two pulleys, the loose pulley being formed with slots and pins projecting from the fixed pulley and entering the slots of the loose pulley.

2. In combination, a shaft, a pulley secured to the shaft, a pin projecting from the pulley, a second pulley loose upon the shaft and having a slot to receive the pin of the fixed pulley, and yieldable connecting means between the two pulleys.

In testimony whereof I affix my signature in presence of a witness.

CHARLES G. CARLSON [L. S.]

Witness:
  JAMES H. JENSEN.